(12) United States Patent
Beaudoin

(10) Patent No.: US 12,547,994 B2
(45) Date of Patent: Feb. 10, 2026

(54) SYSTEMS AND METHODS FOR ESTABLISHING MESSAGE ROUTING PATHS THROUGH A COMPUTER NETWORK

(71) Applicant: MASTERCARD INTERNATIONAL INCORPORATED, Purchase, NY (US)

(72) Inventor: Scott P. Beaudoin, O'Fallon, MO (US)

(73) Assignee: MASTERCARD INTERNATIONAL, Purchase, NY (US)

( * ) Notice: Subject to any disclaimer, the term of this patent is extended or adjusted under 35 U.S.C. 154(b) by 0 days.

(21) Appl. No.: 18/469,240

(22) Filed: Sep. 18, 2023

(65) Prior Publication Data

US 2024/0005291 A1  Jan. 4, 2024

Related U.S. Application Data

(63) Continuation of application No. 16/579,051, filed on Sep. 23, 2019, now Pat. No. 11,763,276, which is a
(Continued)

(51) Int. Cl.
*G06Q 20/08* (2012.01)
*G06Q 20/02* (2012.01)
(Continued)

(52) U.S. Cl.
CPC ....... *G06Q 20/0855* (2013.01); *G06Q 20/027* (2013.01); *G06Q 20/34* (2013.01); *G06Q 30/0611* (2013.01); *H04W 40/00* (2013.01)

(58) Field of Classification Search
CPC ....... G06Q 20/02–027; G06Q 20/0855; G06Q 20/34; G06Q 30/06–0645; G06Q 30/08; G16Y 10/00–90
See application file for complete search history.

(56) References Cited

U.S. PATENT DOCUMENTS 6,397,260 B1  5/2002  Wils et al.
6,999,943 B1  2/2006  Johnson et al.
(Continued)

FOREIGN PATENT DOCUMENTS

CA    2949366 A1   11/2015
CN    1599921 A    3/2005
(Continued)

OTHER PUBLICATIONS

International Preliminary Report on Patentability issued in International Patent Application No. PCT/US2016/041967, dated Jan. 23, 2018, 4 pps.
(Continued)

*Primary Examiner* — Adam L Levine
(74) *Attorney, Agent, or Firm* — Armstrong Teasdale LLP

(57) ABSTRACT

A method for routing computer messages between parties is provided. The method is implemented using a message gateway computing system including a processor and a memory. The method includes receiving a message routing offer from a seller and representing an offer to process payment card transactions. The method also includes receiving a message routing request from a buyer. The method further includes first message route between the buyer party and a first seller party of the plurality of seller parties on a message processing network. The method also includes receiving a payment card transaction from the buyer party. The method further includes identifying the first message route associated with the payment card transaction. The method also includes transmitting the payment card transaction to the first seller party based at least in part on the first message route.

20 Claims, 9 Drawing Sheets

Related U.S. Application Data continuation of application No. 14/802,493, filed on Jul. 17, 2015, now Pat. No. 10,423,937.

(51) Int. Cl.
*G06Q 20/34* (2012.01)
*G06Q 30/0601* (2023.01)
*H04W 40/00* (2009.01)

(56) References Cited

U.S. PATENT DOCUMENTS

| | | | |
|---|---|---|---|
| 7,649,895 B2 | 1/2010 | Kadar et al. | |
| 7,710,932 B2 | 5/2010 | Muthuswamy et al. | |
| 7,801,851 B2 | 9/2010 | Holenstein et al. | |
| 8,321,589 B2 | 11/2012 | Ratica | |
| 8,594,099 B2 | 11/2013 | Park et al. | |
| 8,724,792 B2 * | 5/2014 | Yakman | H04L 45/00 379/221.14 |
| 8,752,042 B2 | 6/2014 | Ratica | |
| 8,781,104 B1 | 7/2014 | Allen et al. | |
| 10,922,749 B1 * | 2/2021 | Thome | G06Q 30/08 |
| 2002/0101967 A1 * | 8/2002 | Eng | H04M 15/51 379/112.01 |
| 2003/0050791 A1 | 3/2003 | Kato | |
| 2006/0004670 A1 | 1/2006 | McKenney et al. | |
| 2009/0144170 A1 * | 6/2009 | Dickelman | G06Q 20/20 705/26.1 |
| 2009/0164324 A1 | 6/2009 | Bishop et al. | |
| 2012/0130842 A1 | 5/2012 | Giordano et al. | |
| 2012/0271765 A1 * | 10/2012 | Cervenka | G06Q 20/12 705/44 |
| 2014/0214651 A1 * | 7/2014 | Prasadh | G06Q 20/12 705/39 |
| 2014/0258556 A1 | 9/2014 | Ratica | |
| 2015/0206164 A1 | 7/2015 | Espana et al. | |
| 2018/0165729 A1 * | 6/2018 | Dickelman | G06Q 20/20 |

FOREIGN PATENT DOCUMENTS

| | | | |
|---|---|---|---|
| CN | 101010687 A | 8/2007 | |
| CN | 101454795 A | 6/2009 | |
| CN | 103392186 A | 11/2013 | |
| CN | 103489095 A | 1/2014 | |
| CN | 104364807 A | 2/2015 | |
| CN | 104603808 A | 5/2015 | |
| EP | 2777007 A1 | 9/2014 | |
| JP | 2002175420 A | 6/2002 | |
| JP | 2002334227 A | 11/2002 | |
| WO | 2001003043 A1 | 1/2001 | |
| WO | WO-0182021 A2 * | 11/2001 | H04L 47/10 |

OTHER PUBLICATIONS

Khandros, "SmartVista i: High-performance payment processing solution on IBM System i," IBM International Technical Support Organization, Redpaper, Feb. 2008. (Year: 2008).

Office Action and Search Report issued in Chinese Patent Application No. 201680041301.6, with English translation, dated Mar. 25, 2021, 9 pps.

PCT Search Report and Written Opinion, Application No. PCT/US2016/041967, dated Oct. 25, 2016, 7 pps.

Sirbu, "Credits and Debits on the Internet," IEEE Spectrum, Feb. 1997, pp. 23-29. (Year: 1997).

Summons to Attend Oral Proceedings issued in European Patent Application No. 16828247.3, dated Jun. 19, 2020, 18 pps.

"Avaya Debuts New Line of Gateways That Protect Networks," Computer Security Update 4, No. 9, (Sep. 1, 2003): N.A. https://dialog.proquest.com/professional/docview/233315713?accountid=131444. (Year: 2003). 7 pages.

* cited by examiner

SYSTEMS AND METHODS FOR ESTABLISHING MESSAGE ROUTING PATHS THROUGH A COMPUTER NETWORK

CROSS REFERENCE TO RELATED APPLICATIONS

This application is a continuation of and claims priority to U.S. patent application Ser. No. 16/579,051 filed on Sep. 23, 2019, entitled "SYSTEMS AND METHODS FOR ESTABLISHING MESSAGE ROUTING PATHS THROUGH A COMPUTER NETWORK", which is a continuation of and claims priority to U.S. patent application Ser. No. 14/802,493 filed on Jul. 17, 2015, entitled "SYSTEMS AND METHODS FOR ESTABLISHING MESSAGE ROUTING PATHS THROUGH A COMPUTER NETWORK", which are hereby incorporated herein by reference in their entirety.

BACKGROUND OF THE DISCLOSURE

This disclosure relates generally to establishing message routing paths through a computer network and, more specifically, to systems and methods for establishing message routing paths through a computer network between users of message processing services and providers of such message processing services.

Routing messages through and between computer networks is a common occurrence in today's computer environment. Such routing of messages may occur within many different kinds of networks including, but not limited to, telephone networks, electronic data networks (e.g., the Internet), and transportation networks. These messages may be routed by using various computing devices such as routers, bridges, gateways, firewalls, switches or other computing devices. As these messages are routed through a computer network, these messages may be transferred from one node to another within a network, or the messages may be transferred from one computer network to another.

One example of routing computer-related messages through a network includes processing payment messages through a payment network. A payor (e.g., a cardholder) may initiate a payment with a merchant. The merchant may in turn generate a payment message that is transmitted through a payment network to one or more of an acquiring bank, a network processor, and an issuing bank. Parties participating in the payment network frequently need to contract with other parties for routing these payment messages through the network. For example, merchants providing goods and services to consumers (i.e., cardholders) may require payment message routing, and banks may require authorization and authentication services. Typically agreements between willing buyers of these message processing services and providers of such services suffer from high transaction costs as the parties must negotiate specific details of the deal, in some cases with multiple parties. Providers of such message routing services (i.e., seller parties) may have unused or underutilized capacity simply because of prohibitive transaction costs for switching between buyer parties or adding more buyer parties. Buyers of such message routing services (i.e., buyer parties) also suffer transaction costs when a selected seller has insufficient capacity, leading the buyer to go elsewhere.

BRIEF DESCRIPTION OF THE DISCLOSURE

In one aspect, a method for routing computer messages between parties is provided. The method is implemented using a message gateway computing system including a processor and a memory. The method comprises receiving, by the message gateway computing system, one or more message routing offers from a plurality of seller parties, wherein each message routing offer represents an offer to process one or more payment card transactions by one of the seller parties, receiving a message routing request from a buyer party, establishing, by the message gateway computing system, a first message route between the buyer party and a first seller party of the plurality of seller parties on a message processing network, receiving a payment card transaction from the buyer party, identifying the first message route associated with the payment card transaction, and transmitting the payment card transaction to the first seller party based at least in part on the first message route.

In another aspect, a message gateway computing system for routing computer messages between two parties is provided. The system comprises a routing database configured to store message routing data received through an enterprise gateway and a message routing engine (MRE) configured to be coupled to the routing database. The MRE is configured to: receive one or more message routing offers from a plurality of seller parties, wherein each message routing offer represents an offer to process one or more payment card transactions by one of the seller parties, receive a message routing request from a buyer party, establish a first message route between the buyer party and a first seller party of the plurality of seller parties on a message processing network, receive a payment card transaction from the buyer party, identify the first message route associated with the payment card transaction, and transmit the payment card transaction to the first seller party based at least in part on the first message route.

In yet another aspect, a non-transitory computer readable medium that includes computer executable instructions for routing computer messages between two parties is provided. When executed by a message routing engine (MRE), the computer executable instructions cause the MRE to receive one or more message routing offers from a plurality of seller parties, wherein each message routing offer represents an offer to process one or more payment card transactions by one of the seller parties, receive a message routing request from a buyer party, establish a first message route between the buyer party and a first seller party of the plurality of seller parties on a message processing network, receive a payment card transaction from the buyer party, identify the first message route associated with the payment card transaction, and transmit the payment card transaction to the first seller party based at least in part on the first message route.

BRIEF DESCRIPTION OF THE DRAWINGS

FIG. 1 is a schematic diagram illustrating an example multi-party transaction card industry system for authorizing payment card transactions in which parties provide processing services to various financial parties.

FIG. 2 is a simplified block diagram of an example message gateway system (MGS) for routing messages.

FIG. 3 illustrates an example configuration of a user system operated by a user, such as a merchant or bank, as shown in FIG. 2.

FIG. 4 illustrates an example configuration of a server system such as the MGS shown in FIG. 2.

FIG. 5 illustrates an example configuration of the MGS in communication with various external parties such as other processing networks, issuing/acquiring hosts, and customer institutions.

FIG. 6 illustrates the various functional subcomponents of the payment message routing engine (MRE) that work together to enable message routing.

FIG. 7 shows an example configuration of an environment in which a buyer and a seller use the message gateway system (MGS) to complete an agreement.

FIG. 8 shows an example method by which the message gateway system (MGS) routes messages between buyers and sellers.

FIG. 9 shows an example configuration of a database within a computing device, along with other related computing components, that may be used to route messages in a matching and routing environment.

Like numbers in the Figures indicate the same or functionally similar components.

DETAILED DESCRIPTION OF THE DISCLOSURE

Figure 1:
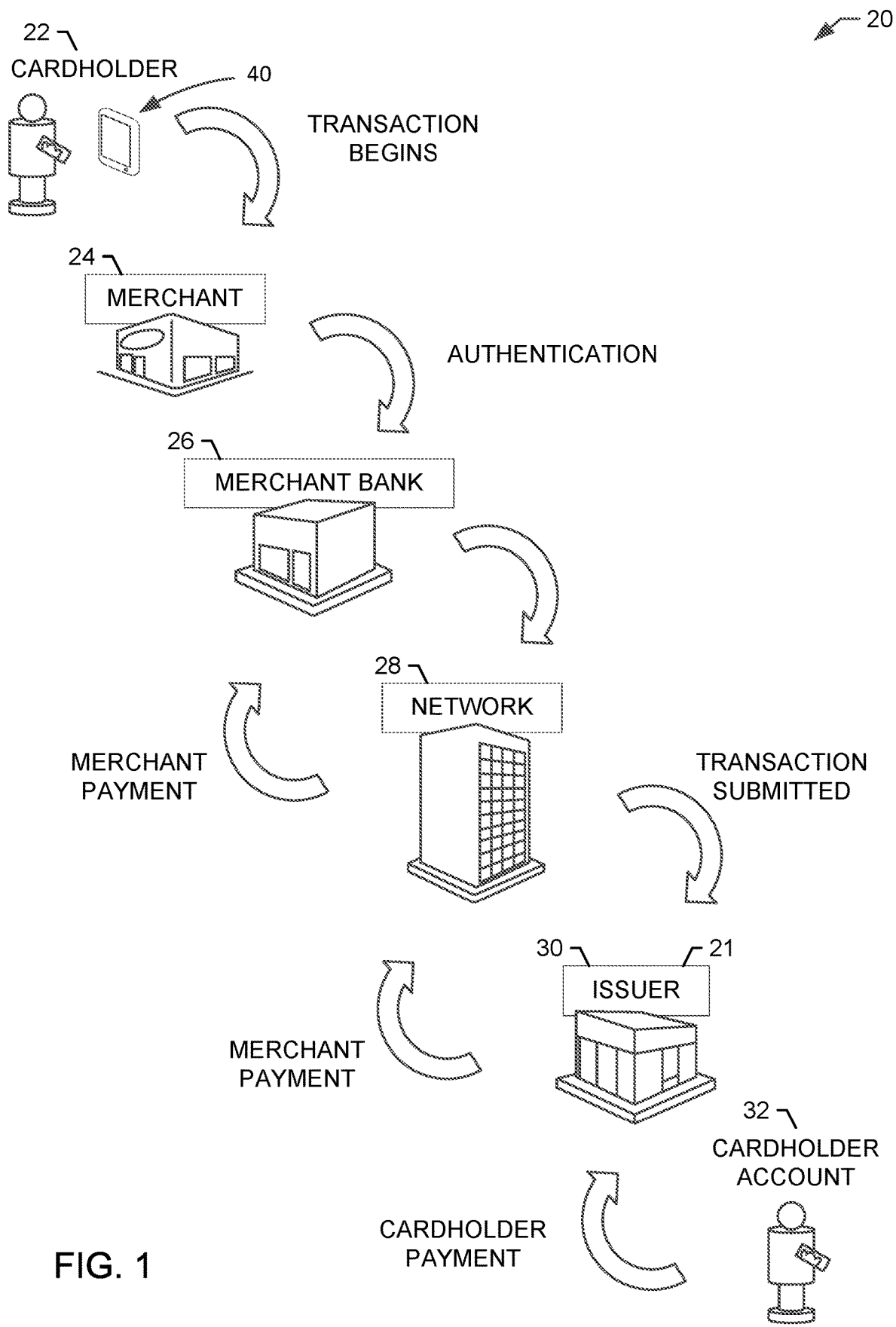
FIGS. 1-9 show example embodiments of the methods and systems described herein.

Systems and methods are described herein for routing electronic messages among buyers and sellers of message routing services. More specifically, the embodiments described herein relate to a message gateway system (MGS) that performs the abovementioned routing.

The message gateway system (MGS) is used for routing messages. In at least some implementations, messages may take the form of payment messages that include transaction data that is generated when a cardholder initiates a transaction at a merchant using a payment card. For example, payment messages may include an authorization request message sent from a merchant to a bank requesting authorization to charge a cardholder's card for a transaction. More specifically, the MGS provides (i) a matching service connecting "seller parties" (e.g., parties providing message processing services) with "buyer parties" (e.g., parties requiring message processing services) interested in payment card transaction processing products and services, and (ii) a routing service configured to route payment messages to the message processors based on the results of the "service agreements" arranged in the matching environment.

Message processors may provide products or services, such as the processing of payment card transactions and/or other value-added services related to message processing, through a shared message processing network, such as a payment gateway. The consumers of these services (i.e., the "buyer parties") also connect to the shared message processing network to leverage these services. The buyer parties may be, for example, merchants, or merchant acquiring banks that handle payment card processing for many merchants. To present these services to the buyer parties, the seller parties generate an "offer" through the MGS. The offer defines a set of "offer parameters" that define aspects of what the seller party will perform as a part of the product or service. For example, the seller party may offer to process X number of payment messages per day at a cost of $Y per payment message for a particular period of time. In addition, the MGS may present operational information to the sellers that they may choose to present as part of their offer parameters (e.g., response time constraints, mean-time-to-restore (MTTR) services, etc.). A buyer party may view many sellers' offers via the MGS and select an offer based on their particular needs (relative to the "offer parameters" of each offer). Additional parties include issuer processors (i.e., parties that provide processing services to issuing banks that issue payment transaction cards to consumers), and acquirer processors (i.e., parties that provide processing services to acquiring banks that may hold merchant accounts).

When a buyer party selects an offer for purchase, the MGS formalizes and electronically executes a contract between the buyer party and the seller party and establishes a "service agreement". Further, the MGS also actively facilitates the performance of the offer through the life of the offer. More specifically, in one embodiment, the MGS performs routing of payment messages from the buyer party to the seller party as defined by the service agreement. When the service agreement becomes active (e.g., during the period of time specified in the offer parameters), the MGS establishes a "messaging route" between the buyer party and the seller party. During operation, the MGS receives payment messages from the buyer party, identifies the active message route, and routes the payment messages to the seller party indicated in the message route. The MGS maintains the message route in active status for the life of the service agreement, and based on the offer parameters. On a predetermined date, prior to the expiration of the service agreement, the MGS will send the seller and buyer a notification to determine if they want to continue their current arrangement, if yes—the MGS asks the seller for the new period of time to present to the buyer, and presents the new service arrangement to the buyer for consummation. If accepted, a new agreement is established with the term dates. If the seller does not provide a new period of time to present to the buyer, or if the buyer does not accept the new service agreement, then once the life of the current service agreement has expired, the MGS deactivates the message route, and the buyer party must secure other arrangements to have their messages processed.

Other services, that the MGS may provide to both parties of the payment gateway switch, could be: network security-fraud management services, format/message translation services, tokenization services, cardholder authentication services, risk-based authentication services, etc. These services would be classified as "value-added services" that the payment gateway switch could provide to any of its directly connected users, and would be presented within the "value-added offer parameters" in addition to the seller's offer parameters to create the total offer to a potential buyer. If "value-added services" were selected by the buyer as part of the service agreement, the MGS would "map" all message routing through the selected services as part of the normal message flow between the buyer and seller. The MGS would monitor and maintain all relative performance and operational metrics associated with the message flows including all selected services.

During an active service agreement, the MGS performs various types of functions in conjunction with the routing. For example, the MGS monitors and maintains all relative performance and operational metrics associated with the message flows including all selected services. The MGS would perform service agreement and service-level objective monitoring and reporting of levels that exceed agreed upon parameters.

The technical problems addressed by this system include at least one of: (i) wasted transaction processing capacity including the cost and effort to maintain unused capacity, (ii) redundant network load because service buyers and sellers are in multiple one to many network relationships rather than interfacing through a single gateway, and (iii) the need to maintain different interoperability frameworks to maintain communication with each co-party party (i.e., the use of complicated and time consuming contracts).

The methods and systems described herein may be implemented using computer programming or engineering techniques including computer software, firmware, hardware, or any combination or subset thereof, wherein the technical effects may be achieved by performing at least one of the following steps: (a) receiving, by the message gateway computing system, one or more message routing offers from a plurality of seller parties, wherein each message routing offer represents an offer to process one or more payment card transactions by one of the seller parties, (b) receiving a message routing request from a buyer party, (c) establishing, by the message gateway computing system, a first message route between the buyer party and a first seller party of the plurality of seller parties on a message processing network, (d) receiving a payment card transaction from the buyer party, (e) identifying the first message route associated with the payment card transaction, and (f) transmitting the payment card transaction to the first seller party based at least in part on the first message route.

The resulting technical benefits achieved by this system include at least one of: (i) providing a flexible, online, near-frictionless interface where transaction processing service buyers and sellers can be matched to each other and (ii) reduce the need for redundant capacity, such that sellers will maintain only as much capacity as dictated by their respective agreements. Thus, the system enables transaction processing and switching buyers and sellers to quickly exchange capacity and more accurately forecast capacity needs.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile computing devices, or desktop, laptop computing devices, and the like. Each type of transaction card can be used as a method of payment for performing a transaction. As used herein, the term "payment account" is used generally to refer to the underlying account with the transaction card.

As used herein, the term "transaction processing" or "transaction switching" refers to the process by which a message processor (e.g., an interchange network server or payment processing computer) routes the computer data messages involved in, for example, authorizing, clearing and settling a payment card transaction. "Transaction processing services" or "transaction switching services" refers to the above process, but may also refer to auxiliary services involved in transaction processing, such as network security-fraud management services, format/message translation services, tokenization services, cardholder authentication services, risk-based authentication services, etc. As used herein, the term "provider network" refers to automated teller machine and/or point-of-sale machine networks that merchants and customers use to complete payment transactions. "Routing" refers to the connection made between a buyer and seller over the enterprise gateway component of the MGS. As used herein, "seller" refers to a vendor or offeror of any type of service associated with transaction processing, such as processing services, authentication services, tokenization services, etc. As used herein, "buyer" refers to any purchaser or offeree of the abovementioned services.

As used herein, a "switching network" refers to one or more interconnected computer servers that support transaction processing for a particular brand of message processing provider or point-of-sale services provider. For example, the switching network may include the MasterCard Worldwide Network, which supports transaction processing for MasterCard®. (MasterCard is a registered trademark of MasterCard International Incorporated located in Purchase, New York). A switching network may also refer to a network of computers that will support transaction processing for any brand of payment card. Examples of the latter include the STAR® network (STAR is a registered trademark of Star Systems, Inc., a First Data company) and the PULSE® network (PULSE is a registered trademark of Pulse, a Discover Financial Services Company).

A "payment gateway" or "gateway" refers to interconnected computer servers that perform the functions of a switching network (i.e., transaction processing) in addition to clearing and settlement functions related to each transactions. As used herein, a payment gateway routes transaction processing and has the ability to interoperate with other switching networks regardless of the particular protocols used by a switching network.

The following detailed description illustrates embodiments of the disclosure by way of example and not by way of limitation. It is contemplated that the disclosure has general application to financial transactions in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions in which parties provide processing services to various financial parties. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, New York).

In a typical transaction card system, a financial institution called the "issuer" issues a transaction card, such as a credit card, to the consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." In one embodiment, cardholder 22 tenders payment for a purchase using a transaction card at a transaction processing device 40 (e.g., a point of sale device), then merchant 24 requests authorization from a merchant bank 26 for the amount of the purchase. The request may be performed over the telephone, but is usually performed through the use of a point-of-sale terminal, which reads cardholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will exchange payment messages with computers of an issuer bank 30 to determine whether cardholder 22's account 32 is in good standing and whether the purchase is covered by cardholder 22's available credit line. Based on these determinations, the request for authorization will be declined or accepted. If the request is accepted, an authorization code is issued to merchant 24.

When a request for authorization is accepted, the available credit line of cardholder 22's account 32 is decreased. Normally, a charge for a payment card transaction is not posted immediately to cardholder 22's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

Further, in some embodiments, interchange network 28 and/or issuer bank 30 stores in database 120 transaction data generated as part of sales activities and savings activities conducted over the interchange network 28 including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store transaction switching capacity data. Database 120 may also store data regarding all offers and all bids for transaction processing services.

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24. As described above, the various parties to the payment card transaction include one or more of the parties shown in FIG. 1 such as, for example, cardholder 22, merchant 24, merchant bank 26, interchange network 28 (also referred to herein as payment processor 28), issuer bank 30, and/or an issuer processor 21.

Figure 2:
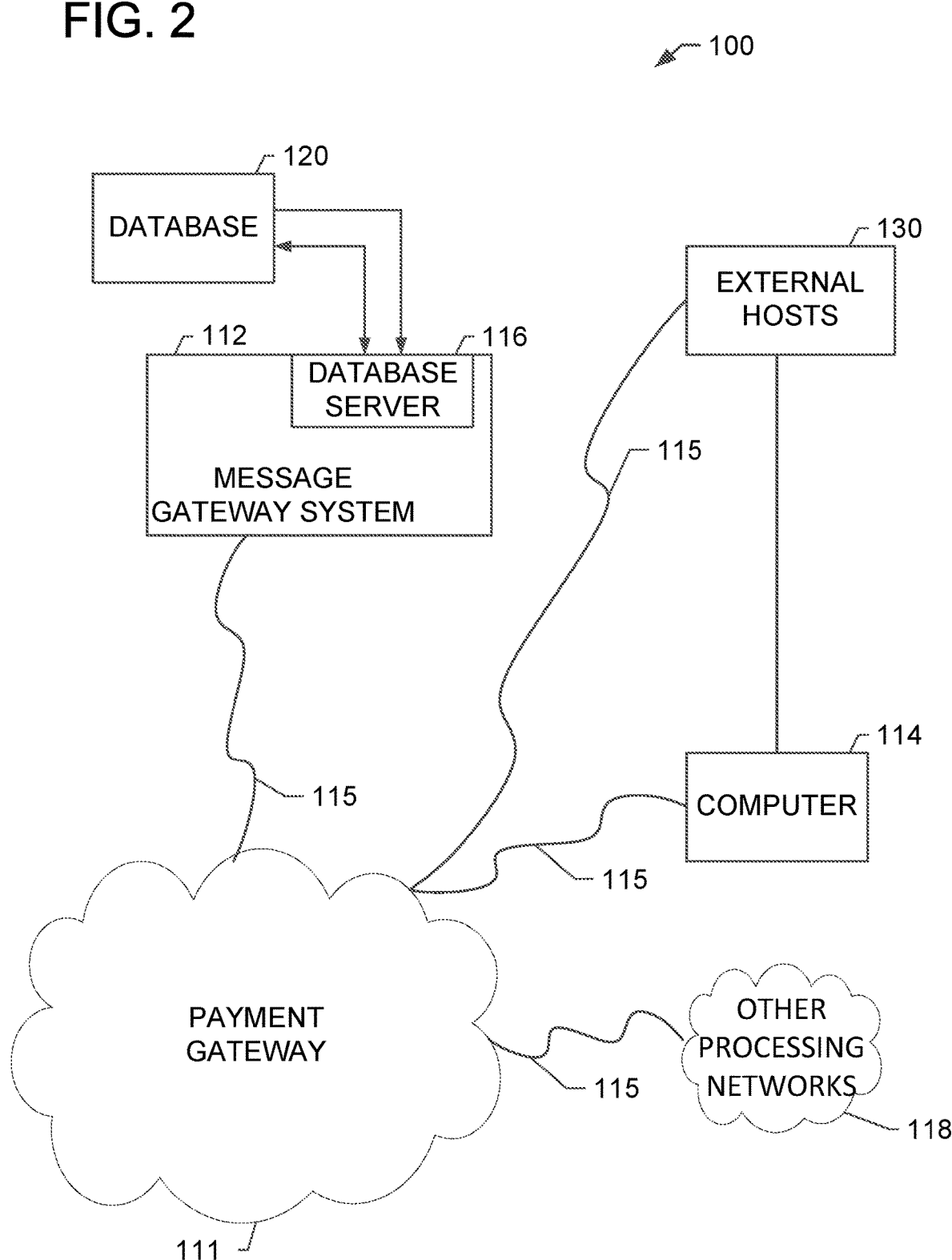

FIG. 2 is a simplified block diagram of an example message routing environment 100. Environment 100 shows a message gateway system (MGS) 112 that is specifically programmed to route offers and requests for transaction processing and switching capacity. MGS 112 is in communication with a payment gateway (PG) 111, a cloud-based networking solution. MGS 112 communicates with other external transaction processing hosts 130, which include issuer host computers, acquirer host computers, provider network computers, and customer institution computers.

MGS 112 is also in communication with other processing networks 118 via PG 111. Other processing networks may include the processing networks for MasterCard (MASTERCARD is a registered trademark of MasterCard International Incorporated located in Purchase, New York), Visa® (VISA is a registered trademark of Visa Corporation, headquartered in Foster City, California, United States), American Express® (AMERICAN EXPRESS is a registered trademark of The American Express Company, headquartered in New York City, New York, United States), Discover® (DISCOVER is a registered trademark of Discover Financial Services, headquartered in Riverwoods, Illinois, United States), (STAR is a registered trademark of Star Systems, Inc., a First Data company headquartered in Atlanta, Georgia, United States), and the PULSE® network (PULSE is a registered trademark of Pulse, a Discover Financial Services Company, headquartered in Riverwoods, Illinois, United States).

In the example embodiment, computers 114 are computers including a web browser, such that MGS 112 is accessible to computers 114 using the Internet or other network. Computers 114 are interconnected to the network through many interfaces including a network 115, such as a local area network (LAN) or a wide area network (WAN), dial-in-connections, cable modems, special high-speed Integrated Services Digital Network (ISDN) lines, and RDT networks. Computers 114 could be any device capable of interconnecting to the Internet including a smartphone, desktop or laptop computer, or other web-based connectable equipment.

A database server 116 is connected to database 120, which contains information on a variety of matters, as described below in greater detail. In one embodiment, database 120 is stored on MGS 112 and can be accessed by potential users of MGS 112. In an alternative embodiment, database 120 is stored remotely from MGS 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store transaction switching capacity data (i.e., data regarding the switching capacity for sellers who use MGS 112). Database 120 may also store operational and performance metrics data regarding each message route established via the MGS. Database 120 may also store data regarding all offers and all bids for transaction processing services.

In the example embodiment, computer 114 may include multiple computers (see FIG. 2). One of computers 114 may be associated with an acquirer bank while another one of computers 114 may be associated with issuer bank 30 (shown in FIG. 1). MGS 112 may be associated with a message processor (such as interchange network 28 or a payment processor.) In the example embodiment, MGS 112 is associated with a network interchange, such as interchange network 28, and may be referred to as an interchange computer system or a message processing computing device. MGS 112 may be used for routing payment message data. In addition, computers 114 and/or external hosts 130 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

In the example embodiment, MGS 112 does not consist of generic computer hardware, nor does it require merely generic computer instructions to perform the above functions. Rather, MGS 112 is a specific and customized computer device built to perform the specific function of providing a matching environment that matches a buyer of transaction processing services with a seller of transaction processing services based on respective requirements of each party. Once matched, payment messages between the buyer and seller are routed through MGS 112 on network paths purpose-built by the MGS 112. In the example embodiment, MGS 112 is tailored to communicate in specific ways with external hosts 130, computers 114, and other processing networks 118. MGS 112 is specifically configured to perform one or more of the data manipulation tasks described herein, such as receiving a transaction processing offer from a seller party, wherein the transaction processing offer represents an offer to process one or more payment card transactions, receiving an acceptance of the transaction processing offer from a buyer party, establishing an active message route between the buyer party and the seller party on a shared message processing network including a first computing device associated with the buyer party and a second computing device associated with the seller party, receiving a payment message from the first computing device, identifying the active message route associated with the payment message, and transmitting the payment message to the second computing device based at least in part on the message route.

Figure 3:
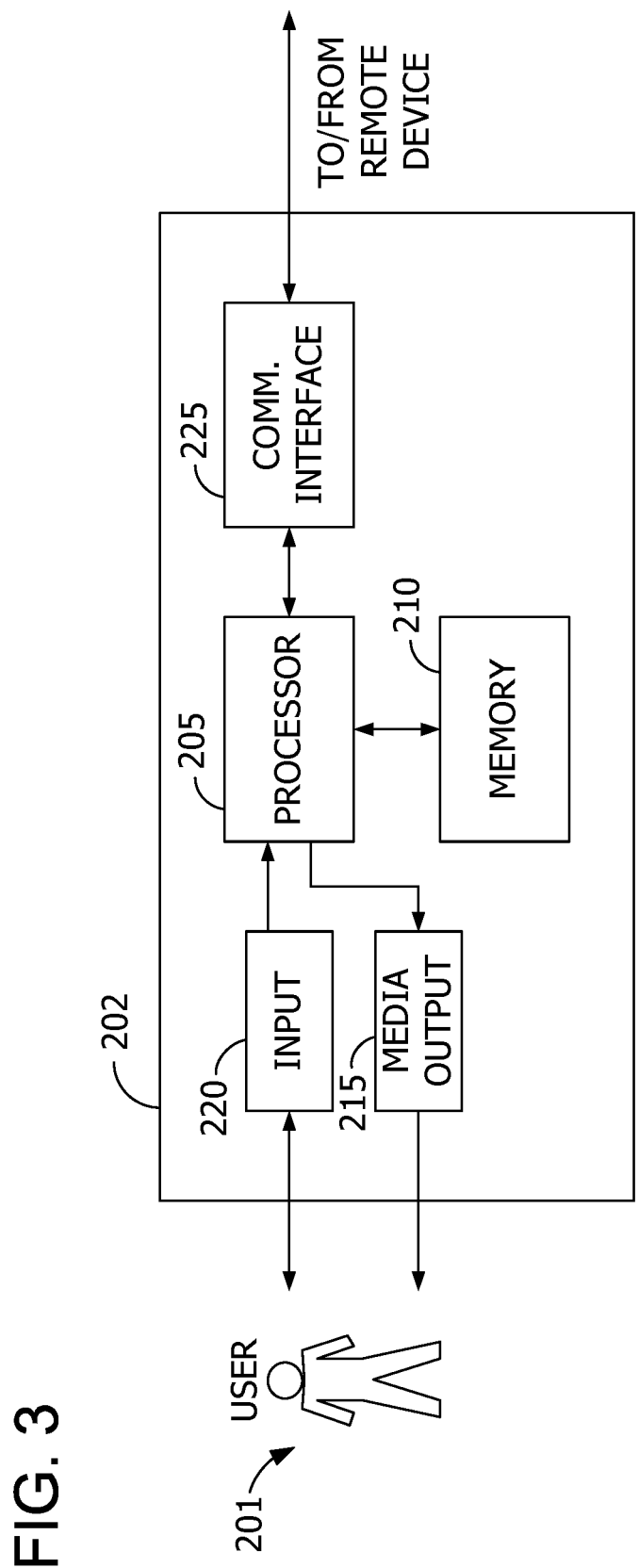

FIG. 3 illustrates an example configuration of a user system operated by a user, such as a merchant or bank, as shown in FIG. 2. User system 202 may include, but is not limited to, computers 114, other processing networks 118, and external hosts 130. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 4:
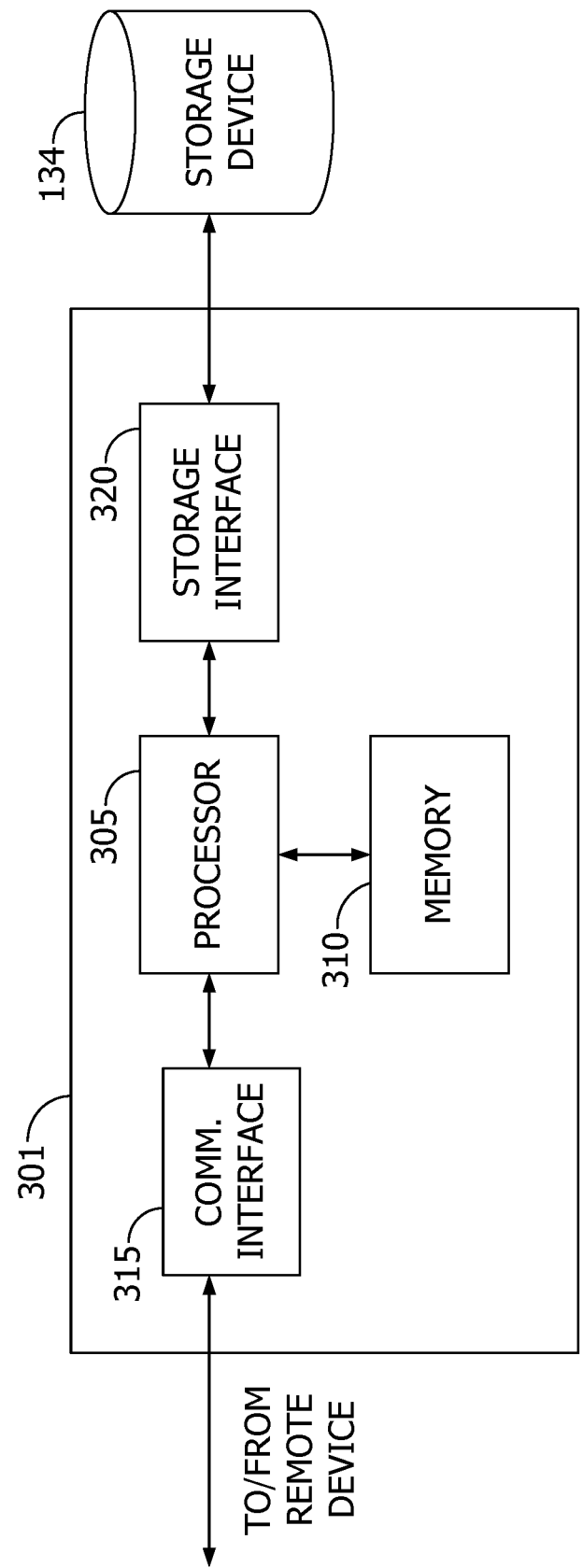

FIG. 4 illustrates an example configuration of a server system such as the MGS 112 shown in FIG. 2 used for matching parties interested in transaction switching capacity. Server system 301 may include, but is not limited to, database server 116, or MGS 112 (shown in FIG. 2). In some embodiments, server system 301 is similar to MGS 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from computers 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320.

Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
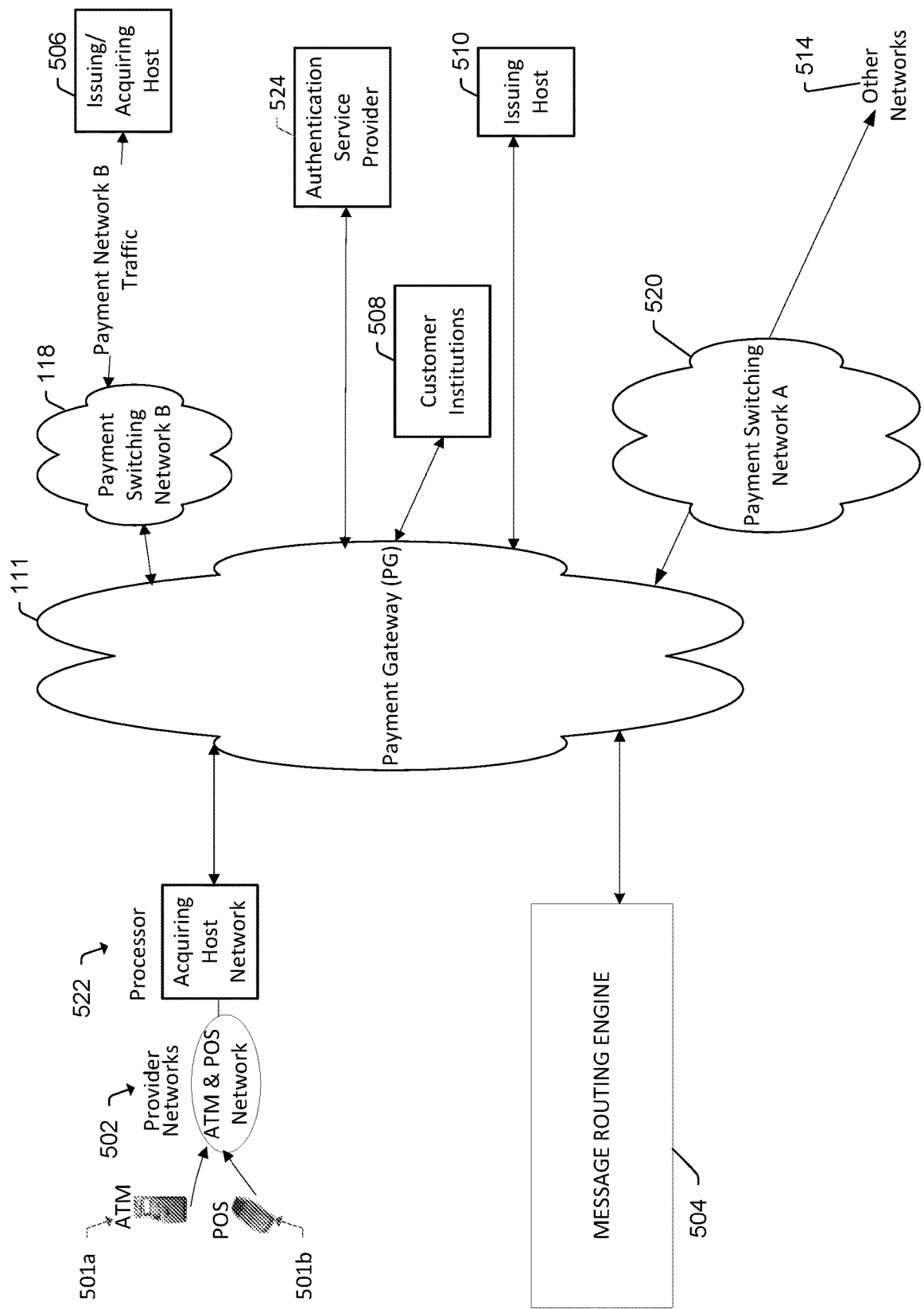

FIG. 5 illustrates an example configuration of a payment message routing engine (MRE) 504, similar to MGS 112 shown in FIG. 2. MRE 504 is in communication with various external parties via PG 111 (shown in FIG. 2). The external parties include other processing networks 118 (e.g., those associated with Visa®, American Express®, or Discover®), issuing/acquiring host 506, issuing host 510, acquiring host 522, and customer institutions 508. Payment switching network A 520 is also connected to PG 111, through which PG 111 receives traffic from other networks 514. Furthermore, provider networks 502 also connect to PG 111 through acquiring host 522. In the example embodiment, provider networks 502 service ATM devices 501a and POS devices 501b. Other service providers also connect to PG 111, (e.g., authentication service provider (ASP) 524).

Parties that connect to PG 111 may have existing connections with each other as well, and may exchange payment messages amongst each other on a one-to-one basis. However, connecting via PG 111 and transacting with use of the MRE 504 enables each party to avail the opportunities offered by all other parties connected to PG 111. Given the higher utilization of PG 111, these parties are able to maximize their own utility and capacity and also choose from a far larger pool of counterparties for their transaction switching service needs. Establishing message routes via PG 111 thus leads to lower cost per transaction as well.

In the exemplary embodiment, issuing/acquiring host 506 may require authentication services during the transaction switching process. Issuing/acquiring host 506 places a request for authentication services with MRE 504, via PG 111. MRE 504 stores details of the request in, for example, database 120 (shown in FIG. 2). Request details may include time period for the services, proposed price to be paid, and other service-specific details such as level of authentication, key contacts, etc. Similarly, ASP 524 places details of its offer for authentication services with MRE 504 via PG 111. Offer details may include similar data such as offer price, time period offer is open, time for providing services, key contacts, etc. MRE 504 uses its internal routing and rules engine to analyze both the request and the offer and determine if there is a match (see FIGS. 6 and 7 for more details). If a match is found, MRE 504 establishes a new message route between issuing/acquiring host 506 and ASP 524. MRE 504 maintains the message route in active status for the life of the service agreement between the parties, and routes payment messages to and from ASP 524 for authentication services for each transaction. Relatedly, MRE 504 collects operational and performance metrics on the request and the offer to improve its routing capability over time.

In another embodiment, acquiring host 522 wishes to connect with an issuing host that supports debit switch technology. Issuing host 510, in the example embodiment, routes single-message-formatted payment messages via PG 111. On request from acquiring host 522, MRE 504 determines that issuing host 510 supports debit switch technology and creates a message route between acquiring host 522 and issuing host 510. MRE 504 then routes payment messages requiring debit switching (e.g., check transactions) through the message route created between acquiring host 522 and issuing host 510.

In yet another embodiment, customer institutions 508 request access to an ATM/POS network for their financial transaction needs. MRE 504 determines that acquiring host 522 is a host for provider network 502 and can provide ATM/POS services for the time period and cost desired by customer institutions 508. MRE 504 creates a message route between acquiring host 522 and customer institutions 508.

Figure 6:
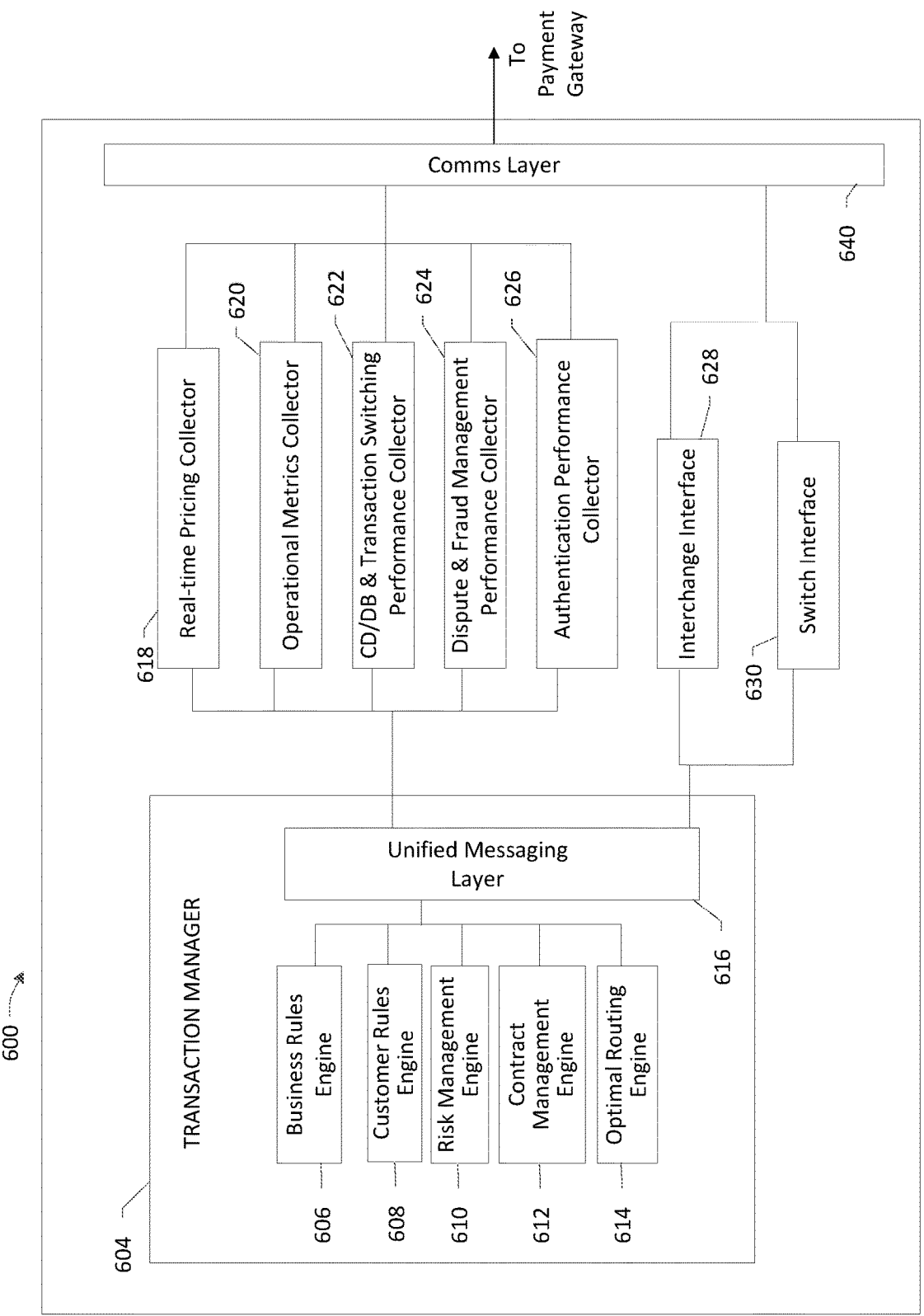

FIG. 6 illustrates the various functional subcomponents of the payment message routing engine (MRE) 600 (similar to MRE 504 in FIG. 5) that operate in concert to enable message routing. In the example embodiment, MRE 600 includes a transaction manager 604, a communications layer 640, and various other components and interfaces. Transaction manager 604 further includes business rules engine 606, customer rules engine 608, risk management engine 610, contract management engine (CME) 612, and optimal routing engine 614. These connect via unified messaging layer 616. Additionally, MRE 600 includes real time pricing collector 618, operational metrics collector 620, credit/debit and transaction switching performance (CTSP) collector 622, dispute and fraud management performance collector 624, and authentication performance collector 626. Furthermore, MRE 600 also includes interchange interface 628 and switch interface 630.

Business rules engine 606 receives business rules data from each offer or request submitted by a seller or buyer (e.g., the request for authentication services referenced above in FIG. 5). Business rules engine 606 determines whether business rules associated with a request will be compatible with business rules received in association with an offer. For example, the authentication services request sent by issuing/acquiring host 506 may include a business rule stating that all authentication services must comply with industry standards, (e.g., strong authentication, requiring at least two forms of authentication from different categories of data). Business rules may also include operational, performance, and price thresholds that a party expects each counterparty to meet. MRE 600 uses the decision of business rules engine 606 in its determination on whether to establish a route between a particular buyer and seller.

Customer rules engine 608 determines whether an offer or request has associated customer rules (e.g., requirements regarding due dates, discount dates and amounts, and any grace periods). Customer rules engine 608 analyzes customer rules requirements presented in a request and determines whether any offers correspond to those requirements.

Risk management engine 610 checks each offer and request against known risk factors such as abnormally high or low offers of price, claims of extreme speed or capacity, and the like. As the volume of messages increases, risk management engine 610 learns to identify common patterns and is able to reject offers or requests that deviate significantly from those patterns. Risk management engine 610 also flags associated sellers and buyers such that MRE 600 can quickly set aside such parties on future contact in favor of parties that communicate more typical offers and requests. In this way, risk management engine 610 accelerates the message routing process.

Contract management engine (CME) 612 receives offers and requests from sellers and buyers and, in the event of a match and agreement, consummates the contract for the parties. In an example embodiment, customers (sellers or buyers) of PG 111 wish to trade transaction switching capacity. Once the customer provides its business rules and customer rules, CME 612 determines the optimal solution for the customer, and/or provides the customer with a number of options that present a possible match. On presentment to the customer of a single solution, a route is proposed. In this example, if the customer is satisfied with the offered solution, the customer expresses affirmation, and CME 612 communicates this acceptance to the offeror of the solution. In this way, a deal is struck and a contract is consummated for the time period contained within the solution. In the example recited above in FIG. 5, issuing/acquiring host 506 communicates its requirements for authentication services to MRE 600 (MRE 504 in FIG. 5). MRE 600 presents issuing/acquiring host 506 with the authentication services solution offered by ASP 524 based on a determination by MRE 600 that ASP 524's solution matches the requirements of issuing/acquiring host 506. In some embodiments, CME 612 issues a notification at least to administrators of PG 111 in the event that a seller or buyer is not performing the contract according to its agreed-upon provisions.

In the auction example, issuing/acquiring host 506's requirements are presented to one or more sellers. MRE 600 provides an online interface through which multiple sellers are able to bid on issuing/acquiring host 506. CME 612 defines a bidding period and, at the conclusion of the period, duly consummates a contract between issuing/acquiring host 506 and the winning bidder at the auction. Both the winner and issuing/acquiring host 506 are electronically notified of the result, and the proposed agreement. If both parties agree, the contract is complete, a message route is created, and CME 612 proceeds to manage the execution of the contract by both parties.

Notably, issuing/acquiring host 506 is not required to parse through various offers and contact each associated party for prolonged negotiations. Neither is issuing/acquiring host 506 required to investigate into the veracity of ASP 524's claims, (e.g., regarding capacity). Since ASP 524 is already a trusted partner of PG 111, what MRE 600 (via contract management engine 612) enables is a near-frictionless way for issuing/acquiring host 506 to meet its authentication services needs, and for ASP 524 to generate value from its unused authentication services capacity.

While two parties may agree on business rules and customer rules, a message route between them may be infeasible in operational or performance terms. Optimal routing engine 614 receives operational and performance metrics from metrics collectors (described below) and tests each potential message route for efficiency. In the aforementioned example, ASP 524 offers authentication services that match issuing/acquiring host 506's requirements. But another authentication services provider ASP X (not shown) may meet those same requirements, yet also offer superior speed, or greater reliability or uptime, or more seamless interoperability with issuing/acquiring host 506's systems. In this embodiment, optimal routing engine 614 uses metrics data it receives to determine that ASP X is the optimal authentication services provider for issuing/acquiring host 506. In this embodiment, MRE 600 uses this information and establishes a message route for issuing/acquiring host 506 with ASP X instead of ASP 524.

Real time pricing collector 618 records data regarding pricing for each offer and request. Real time pricing collector 618 builds models of historical pricing data and provides that data to at least risk management engine 610 to assess whether incoming offers and requests are at price points that are reasonably consistent with typical patterns. Operational metrics collector 620 collects data such as system configurations of, for example, connected issuing and acquiring hosts. Similarly, the credit/debit and transaction switching performance (CTSP) collector 622 collects performance metrics for each payment message traveling through each route established by the MRE 600. CTSP collector 622 records data such as time taken for each payment message, frequency of messages, system uptimes and downtimes, and the like. CTSP collector 622 provides this data at least to contract management engine 612. In this way, contract management engine 612 assesses whether message routing performance meets or fails the terms of the contract that was the basis for establishing a particular message route.

Dispute and fraud management performance collector 624 collects data relating to disputes and/or fraud that occurs on any particular message route. In the example embodiment, authentication performance collector 626 records authentication data, (e.g., speed of authentication, number of failed authentication attempts, reliability, security compliance data, and the like). Authentication performance collector 626 provides this data to, for example, optimal routing engine 614, which in turn determines whether a message route created for authentication services is the optimal route.

In the example embodiment, interchange interface 628 is an interface between MRE 600 and other interchange networks that are connected to PG 111. In one embodiment, interchange interface 628 is a software-based interface that represents a connection between MRE 600 and other interchanges (e.g., VisaNet; VISANET® is a registered trademark of Visa International Service Association), in the service of establishing message routes. In another embodiment, interchange interface 628 may be a hardware-based component, such as a dedicated server or servers. Similarly, switch interface 630 is, in one embodiment, a software application that can interface with, for example, POS and/or ATM systems, consolidate payment messages, and route to message processors for switching (i.e., authorization, clearing, and settlement). Finally, communication between MRE 600 and PG 111 travels through dedicated communications layer 640, which may be composed of software interfaces and/or hardware.

Figure 7:
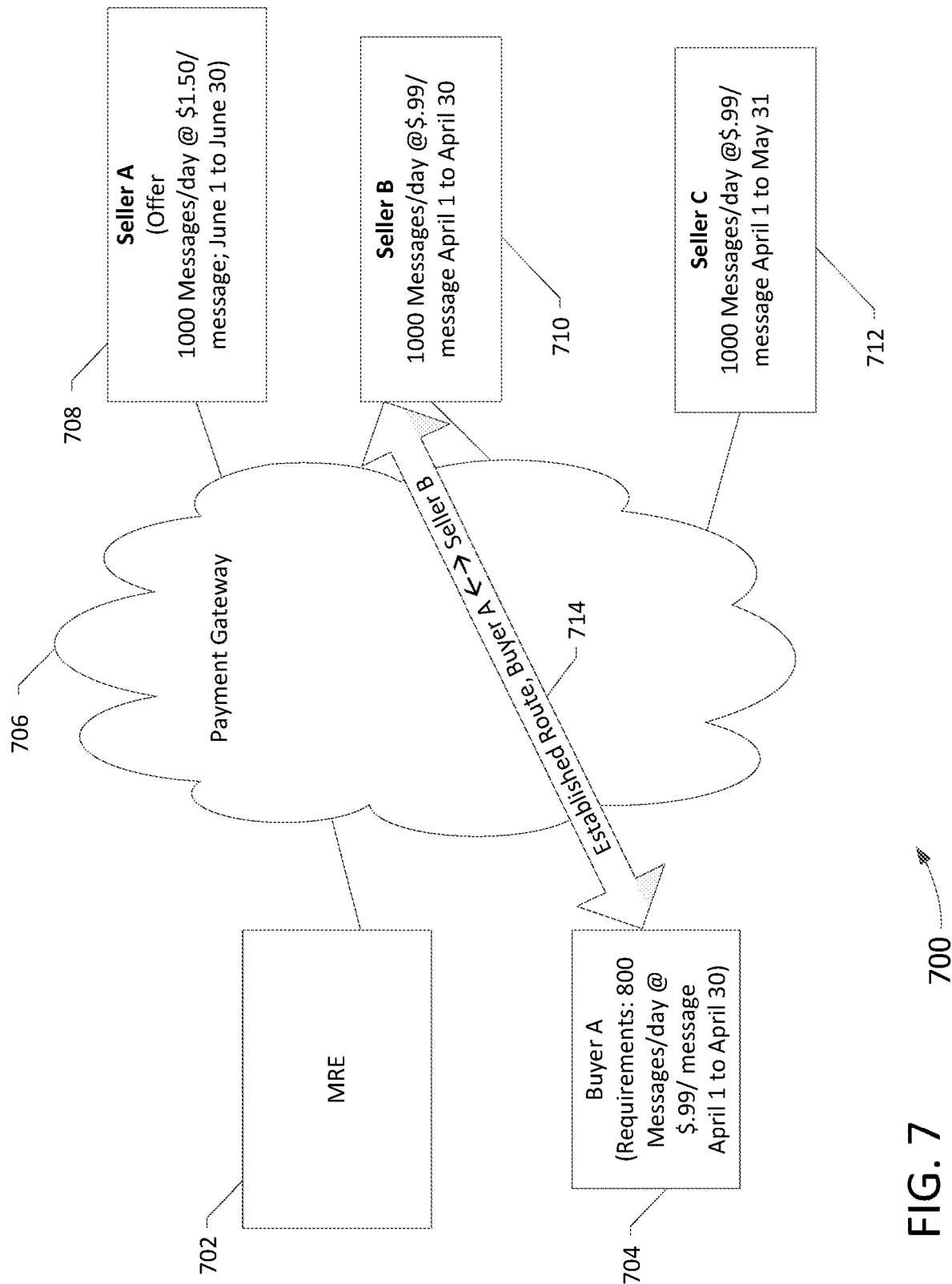

FIG. 7 shows an example configuration of an environment in which a buyer and a seller use MGS 700 to complete an agreement. In the example embodiment, buyer 704 communicates its requirements to MRE 702 (similar to MRE 600 in FIG. 6) for transaction switching. For example, buyer A 704 may need to process 800 payment messages a day, wish to pay no more than $0.99 per payment message, and require message routing services between April 1 and April 30. In the example embodiment, MRE 702 receives at least two offers, one each from seller A 708 and seller B 710. MRE 702 determines that seller B 710 matches buyer A 704's price and timing requirements and more than meets buyer A 704's volume requirements at 1000 payment messages/day. Seller A 708 does not meet buyer A 704's requirements. Seller C meets buyer 704's requirements but for a longer period of time than required. MRE 702 presents the offers of seller B 710 and seller C 712 to buyer 704 for approval. For example, if buyer 704 approves the seller B 710 offer, then MRE 702, via payment gateway 706 (similar to PG 111 in FIG. 5) establishes a message route 714 between buyer A 704 and seller B 710 for April 1 to April 30. Additionally, operational metrics collector 620 records that seller B 710 has 200 messages/day worth of excess capacity that can be offered to another buyer.

In another embodiment, buyer 704 communicates its requirements to MRE 702 but also communicates that buyer 704 will accept any offer that MRE 702 determines is suitable for the requirements of buyer 704. In other words, buyer 704 may be seller-agnostic and may, for example, simply ask for the best rate or lowest overall cost. In this embodiment, MRE 702 is configured to analyze the requirements of buyer 704 and automatically create a message route between buyer 704 and the most suitable seller out of all available sellers. In this embodiment, MRE 702 automatically creates a message route between buyer A 704 and seller B 710. For example, MRE 702 may determine that seller B 710 is a better choice than seller C 712, because buyer A 704 may wish to generate a new route after April 30.

Figure 8:
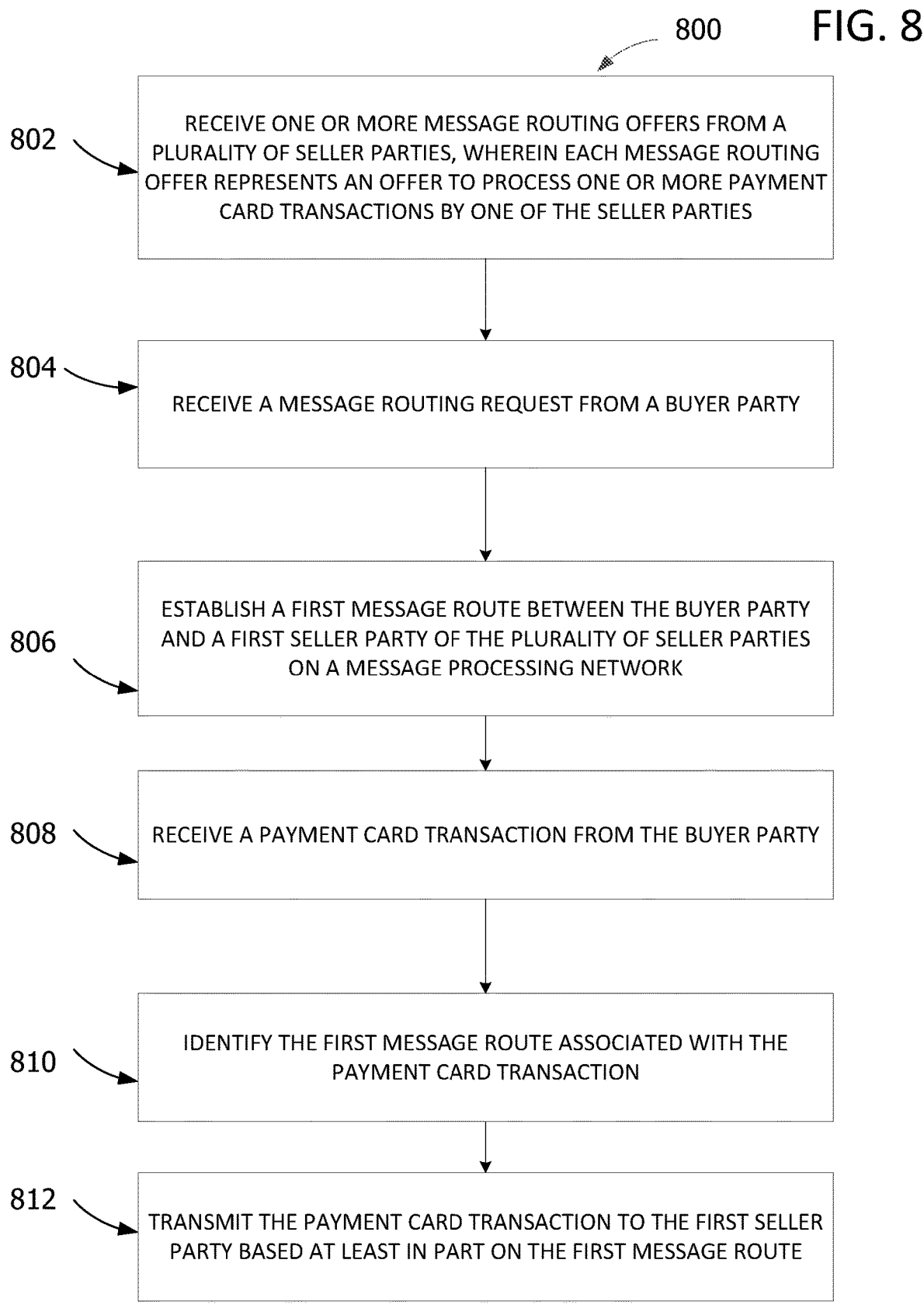

FIG. 8 shows an example method by which the message gateway system (MGS) routes payment messages between buyers and sellers. In the exemplary embodiment, MGS 700 receives 802 a one or more message routing offers from a plurality of seller parties, wherein each message routing offer represents an offer to process one or more payment card transactions by one of the seller parties. MGS 700 receives 804 a message routing request from a buyer party. MGS 700 establishes 806 a first message route between the buyer party and a first seller party of the plurality of seller parties on a message processing network. MGS 700 receives 808 a payment card transaction from the buyer party. MGS 700 identifies 810 the first message route associated with the payment card transaction. MGS 700 transmits 812 the payment card transaction to the first seller party based at least in part on the first message route.

Figure 9:
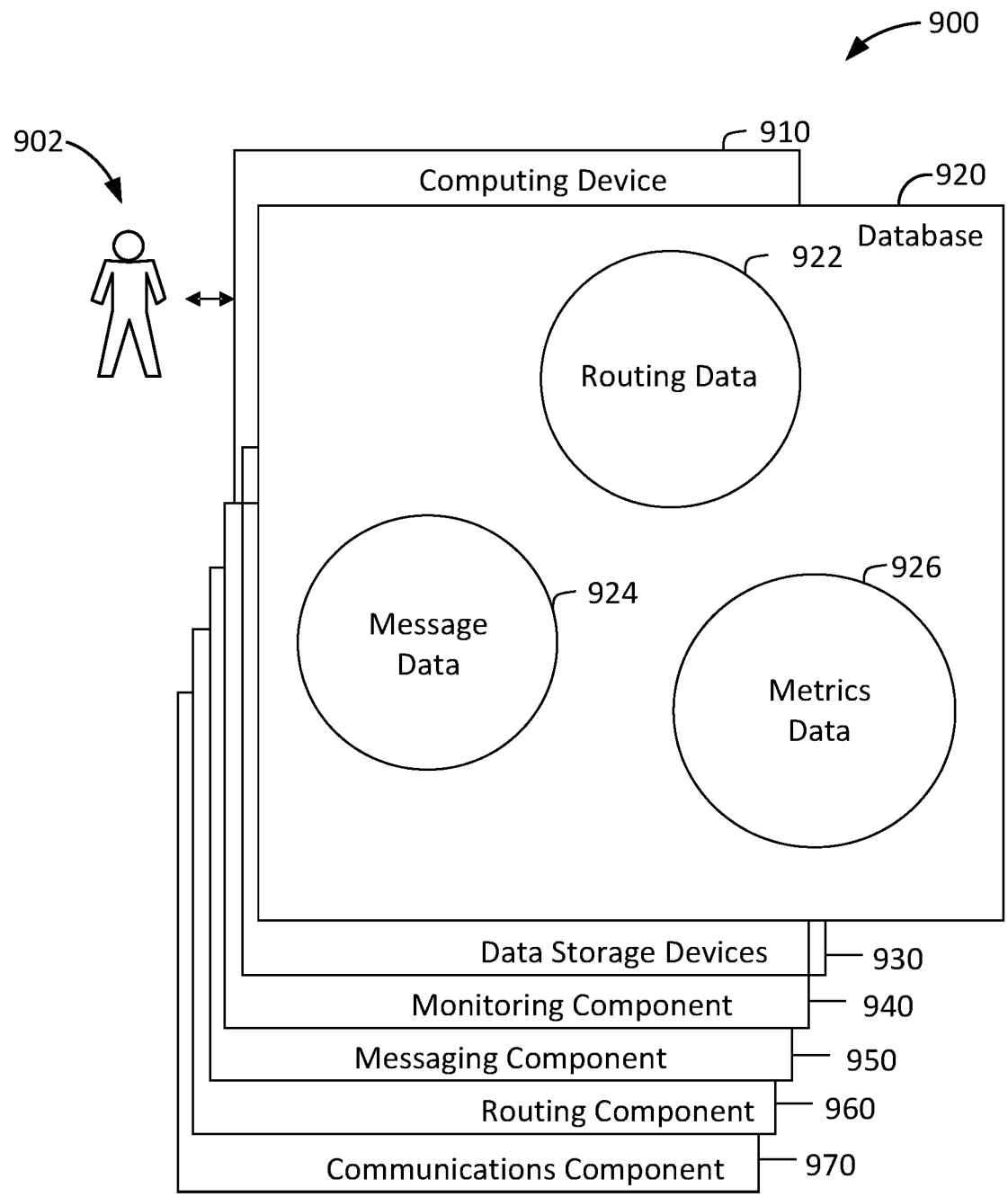

FIG. 9 shows an example configuration of a database 900 within a computing device, along with other related computing components, that may be used to route messages in a payment card transaction environment. In some embodiments, computing device 910 is similar to MGS 112 (shown in FIG. 2). User 902 may access computing device 910 in order to request the establishment of a message route. In some embodiments, database 920 is similar to database 120 (shown in FIG. 2). In the example embodiment, database 920 includes routing data 922, message data 924, and metrics data 926. Routing data 922 includes data regarding each message route established between messaging parties, (e.g., the duration of routing, any related service level agreements, etc.) Message data 924 includes data about the types of messages flowing through each route (e.g., authorization request messages) as well as quantity of messages. Metrics data 926 includes historical data regarding operational efficiency and compliance with established operational prerequisites, as well as performance metrics measuring the performance of transaction processors over time.

Computing device 910 also includes data storage devices 930. Computing device 910 also includes monitoring component 940 that actually detects operational and performance metrics for storage in metrics data 926. Computing device 910 also includes messaging component 950 that processes messages flowing through routes set up on PG 111. Computing device 910 also includes routing component 960 that is responsible for creating and updating the network routes on which payment messages flow. Computing device 910 also includes communications component 970 which is used to communicate with seller and buyer parties, set up agreements, display offer and request data, and perform reporting tasks for computing device 910 users.

As will be appreciated based on the foregoing specification, the above-described embodiments of the disclosure may be implemented using computer programming or engineering techniques including computer software, firmware, hardware or any combination or subset thereof, wherein the technical effect is to establish message routes between buyers and sellers of transaction processing services capacity. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A message gateway computing system for routing computer messages between at least one seller computer device and at least one buyer computer device, the system comprising:
   a routing database configured to store message routing data received through an enterprise gateway; and
   a message routing engine (MRE) computing device including at least one processor and coupled to the routing database, the at least one processor configured to:
      receive operational parameters associated with a plurality of message routes between buyer computer devices and seller computer devices associated with a plurality of seller parties;
      electronically test one or more of the plurality of message routes to identify at least one first seller computer device from the seller computer devices that has a message route of the one or more message routes that includes actual operational parameters that at least meet or exceed at least one performance parameter of at least one first buyer computer device of the buyer computer devices, wherein the actual operational parameters for a particular message route include at least one actual operational performance value representing how the particular message route operates when routing messages, and wherein electronically testing the one or more message routes includes determining a degree of interoperability between computer devices included in the plurality of message routes using the received operational parameters;
      select a message route of the one or more tested message routes for transporting one or more messages between the at least one first buyer computer device and the at least one first seller computer device based on a (i) comparison of the actual operational parameters for each of the one or more tested message routes against the actual operational parameters for others of the one or more tested message routes and (ii) the determined degree of interoperability, the selected message route including at least one of the actual operational parameters that is superior in comparison to a corresponding one of the actual operational parameters for others of the plurality of message routes;
      establish the selected message route by storing in the routing database the selected message route;
      receive a message from the at least one buyer computer device;
      perform a lookup with the routing database to identify the established selected message route for transporting the message; and
      cause the message to be transmitted to the at least one first seller computer device via the established selected message route.

2. The message gateway computing system of claim 1, wherein the at least one processor is further configured to:
   receive one or more message routing offers from the seller computer devices, wherein each message routing offer (i) represents one of the plurality of message routes to process a plurality of messages by at least one of the seller computer devices using the one message route and (ii) includes one or more operational parameters that the at least one seller computer device agrees to provide when routing the plurality of messages using the one message route.

3. The message gateway computing system of claim 1, wherein the at least one processor is further configured to:
   receive a message routing request from the at least one first buyer computer device that includes the at least one performance parameter of the at least one first buyer computer device for routing a plurality of messages for the at least one first buyer computer device.

4. The message gateway computing system of claim 1, wherein the at least one processor is further configured to establish the selected message route by storing in the routing database a time period for maintaining the selected message route.

5. The message gateway computing system of claim 4, wherein the at least one processor is further configured to confirm that the received message was received within the time period.

6. The message gateway computing system of claim 1, wherein the operational parameters include at least one of speed or uptime associated with each message route, and wherein at least one operational performance value of each message route is associated with at least one of the speed or the uptime associated with that message route.

7. The message gateway computing system of claim 1, wherein the at least one processor is further configured to:
identify a subset of the seller computer devices for which at least (i) one seller rule matches one requested seller rule and (ii) one buyer rule matches one requested buyer rule; and
receive metrics data associated with each of the plurality of message routes corresponding to the identified subset of the seller computer devices, the metrics data including at least one of one or more operational metrics or one or more performance metrics.

8. A method for routing computer messages between at least one seller computer device and at least one buyer computer device, the method implemented using a message gateway computing system including at least one processor coupled to a routing database, the method comprising:
receiving operational parameters associated with a plurality of message routes between buyer computer devices and seller computer devices associated with a plurality of seller parties;
electronically testing one or more of the plurality of message routes to identify at least one first seller computer device from the seller computer devices that has a message route of the one or more message routes that includes actual operational parameters that at least meet or exceed at least one performance parameter of at least one first buyer computer device of the buyer computer devices, wherein the actual operational parameters for a particular message route include at least one actual operational performance value representing how the particular message route operates when routing messages, and wherein electronically testing the one or more message routes comprises determining a degree of interoperability between computer devices included in the plurality of message routes using the received operational parameters;
selecting a message route of the one or more tested message routes for transporting one or more messages between the at least one first buyer computer device and the at least one seller computer device based on a (i) comparison of the actual operational parameters for each of the one or more tested message routes against the actual operational parameters for others of the one or more tested message routes and (ii) the determined degree of interoperability, the selected message route including at least one of the actual operational parameters that is superior in comparison to a corresponding one of the actual operational parameters for others of the plurality of message routes;
establishing the selected message route by storing in the routing database the selected message route;
receiving a message from the at least one buyer computer device;
performing a lookup with the routing database to identify the established selected message route for transporting the message; and
causing the message to be transmitted to the at least one first seller computer device via the established selected message route.

9. The method of claim 8 further comprising:
receiving one or more message routing offers from the seller computer devices, wherein each message routing offer (i) represents one of the plurality of message routes to process a plurality of messages by at least one of the seller computer devices using the one message route and (ii) includes one or more operational parameters that the at least one seller computer device agrees to provide when routing the plurality of messages using the one message route.

10. The method of claim 8 further comprising:
receiving a message routing request from the at least one first buyer computer device that includes the at least one performance parameter of the at least one first buyer computer device for routing a plurality of messages for the at least one first buyer computer device.

11. The method of claim 8 further comprising establishing the selected message route by storing in the routing database a time period for maintaining the selected message route.

12. The method of claim 11 further comprising confirming that the received message was received within the time period.

13. The method of claim 8, wherein the operational parameters include at least one of speed or uptime associated with each message route, and wherein at least one operational performance value of each message route includes at least one of speed or uptime associated with that message route.

14. The method of claim 8 further comprising:
identifying a subset of the seller computer devices for which at least (i) one seller rule matches one requested seller rule and (ii) one buyer rule matches one requested buyer rule; and
receiving metrics data associated with each of the plurality of message routes corresponding to the identified subset of the seller computer devices, the metrics data including at least one of one or more operational metrics or one or more performance metrics.

15. At least one non-transitory computer readable medium that includes computer-executable instructions for routing computer messages between two parties, wherein when executed by at least one processor of a message routing engine (MRE) coupled to a routing database, the computer-executable instructions cause the at least one processor to:
receive operational parameters associated with a plurality of message routes between buyer computer devices and seller computer devices associated with a plurality of seller parties;
electronically test one or more of the plurality of message routes to identify at least one first seller computer device the seller computer devices that has a message route of the one or more message routes that includes actual operational parameters that at least meet or exceed at least one performance parameter of at least one first buyer computer device of the buyer computer devices, wherein the actual operational parameters for a particular message route include at least one actual operational performance value representing how the particular message route operates when routing messages, and wherein electronically testing the one or more message routes comprises determining a degree of interoperability between computer devices included in the plurality of message routes using the received operational parameters;

select a message route of the one or more tested message routes for transporting one or more messages between the at least one first buyer computer device and the at least one first seller computer device based on a (i) comparison of the actual operational parameters for each of the one or more tested message routes against the actual operational parameters for others of the one or more tested message routes and (ii) the determined degree of interoperability, the selected message route including at least one of the actual operational parameters that is superior in comparison to a corresponding one of the actual operational parameters for others of the plurality of message routes;

establish the selected message route by storing in the routing database the selected message route;

receive a message from the at least one buyer computer device;

perform a lookup with the routing database to identify the established selected message route for transporting the message; and cause the message to be transmitted to the at least one first seller computer device via the established selected message route.

16. The least one non-transitory computer readable medium of claim 15, wherein the computer-executable instructions further cause the at least one processor to:
receive one or more message routing offers from the seller computer devices, wherein each message routing offer (i) represents one of the plurality of message routes to process a plurality of messages by at least one of the seller computer devices using the one message route and (ii) includes one or more operational parameters that the at least one seller computer device agrees to provide when routing the plurality of messages using the one message route.

17. The least one non-transitory computer readable medium of claim 15, wherein the computer-executable instructions further cause the at least one processor to:
receive a message routing request from the at least one first buyer computer device that includes the at least one performance parameter of the at least one first buyer computer device for routing a plurality of messages for the at least one first buyer computer device.

18. The least one non-transitory computer readable medium of claim 15, wherein the computer-executable instructions further cause the at least one processor to establish the selected message route by storing in the routing database a time period for maintaining the selected message route.

19. The least one non-transitory computer readable medium of claim 15, wherein the operational parameters include at least one of speed or uptime associated with each message route, and wherein at least one operational performance value of each message route is associated with at least one of speed or uptime associated with that message route.

20. The least one non-transitory computer readable medium of claim 15, wherein the computer-executable instructions further cause the at least one processor to:
identify a subset of the seller computer devices for which at least (i) one seller rule matches one requested seller rule and (ii) one buyer rule matches one requested buyer rule; and
receive metrics data associated with each of the plurality of message routes corresponding to the identified subset of the seller computer devices, the metrics data including at least one of one or more operational metrics or one or more performance metrics.

* * * * *